(12) United States Patent
Notani et al.

(10) Patent No.: US 7,606,224 B2
(45) Date of Patent: Oct. 20, 2009

(54) TRANSMISSION APPARATUS FOR MAKING RING SWITCHING AT SONET/SDH AND RPR LEVELS

(75) Inventors: Morihito Notani, Kawasaki (JP); Masahiro Nishio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 833 days.

(21) Appl. No.: 10/754,724

(22) Filed: Jan. 12, 2004

(65) Prior Publication Data

US 2004/0151172 A1    Aug. 5, 2004

(30) Foreign Application Priority Data

Jan. 31, 2003    (JP)    ............... 2003-025000

(51) Int. Cl.
*H04L 12/40* (2006.01)
(52) U.S. Cl. ............... 370/386; 370/404; 398/59
(58) Field of Classification Search ............ 370/235, 370/258, 351, 380, 386–389, 392, 396, 395.21, 370/400–406, 419, 452; 398/54–59, 79
See application file for complete search history.

(56) References Cited

U.S. PATENT DOCUMENTS

| | | | |
|---|---|---|---|
| 2003/0021519 A1* | 1/2003 | Zalevsky et al. ............... 385/16 |
| 2003/0233579 A1* | 12/2003 | Kimura et al. ............... 713/201 |
| 2004/0008692 A1* | 1/2004 | Bamba ................... 370/395.51 |
| 2004/0076168 A1* | 4/2004 | Patenaude ................... 370/406 |
| 2004/0190444 A1* | 9/2004 | Trudel et al. ................. 370/224 |
| 2004/0208554 A1* | 10/2004 | Wakai et al. .................. 398/54 |
| 2006/0120719 A1* | 6/2006 | Bradford et al. ............... 398/31 |
| 2006/0251419 A1* | 11/2006 | Zadikian et al. ............... 398/51 |

FOREIGN PATENT DOCUMENTS

| | | |
|---|---|---|
| EP | 1 091 529 | 4/2001 |
| JP | 2001-160840 | 6/2001 |
| JP | 2001-186188 | 7/2001 |
| JP | 2003-134074 | 5/2003 |
| JP | 2003-259471 | 9/2003 |

OTHER PUBLICATIONS

Darrin Woods, "RPR Soups Up Sonet and Ethernet", Jan. 23, 2003, Network computing; pp. 77-81.*
Kapoor et al., "RPR over SONET/SDH", Sep. 2001, Appian Communications, Inc., pp. 1-10.*
Vittorio Mascolo, "RPR Over SDH/SONET Protection Interaction", Aug. 31, 2001, IEEE 802.17 RPRWG; pp. 1-10.*
Busi et al., "Mapping of RPR over Sonet/SDH", Jul. 2001,IEEE 802.17 RPRWG; pp. 1-16.*
Japanese Patent Office Action, mailed Oct. 2, 2007 and issued in corresponding Japanese Patent Application No. 2003-025000.

* cited by examiner

*Primary Examiner*—Hong Cho
*Assistant Examiner*—Saba Tsegaye
(74) *Attorney, Agent, or Firm*—Staas & Halsey LLP

(57) ABSTRACT

A transmission apparatus includes an aggregate-side interface unit coupled to an optical transmission line, a cross-connect unit which performs cross-connect with respect to a synchronized digital signal supplied from the aggregate-side interface unit, and a network signal processing unit which switches the synchronized digital signal in a unit of a network signal as the synchronized digital signal is supplied from the cross-connect unit.

8 Claims, 10 Drawing Sheets

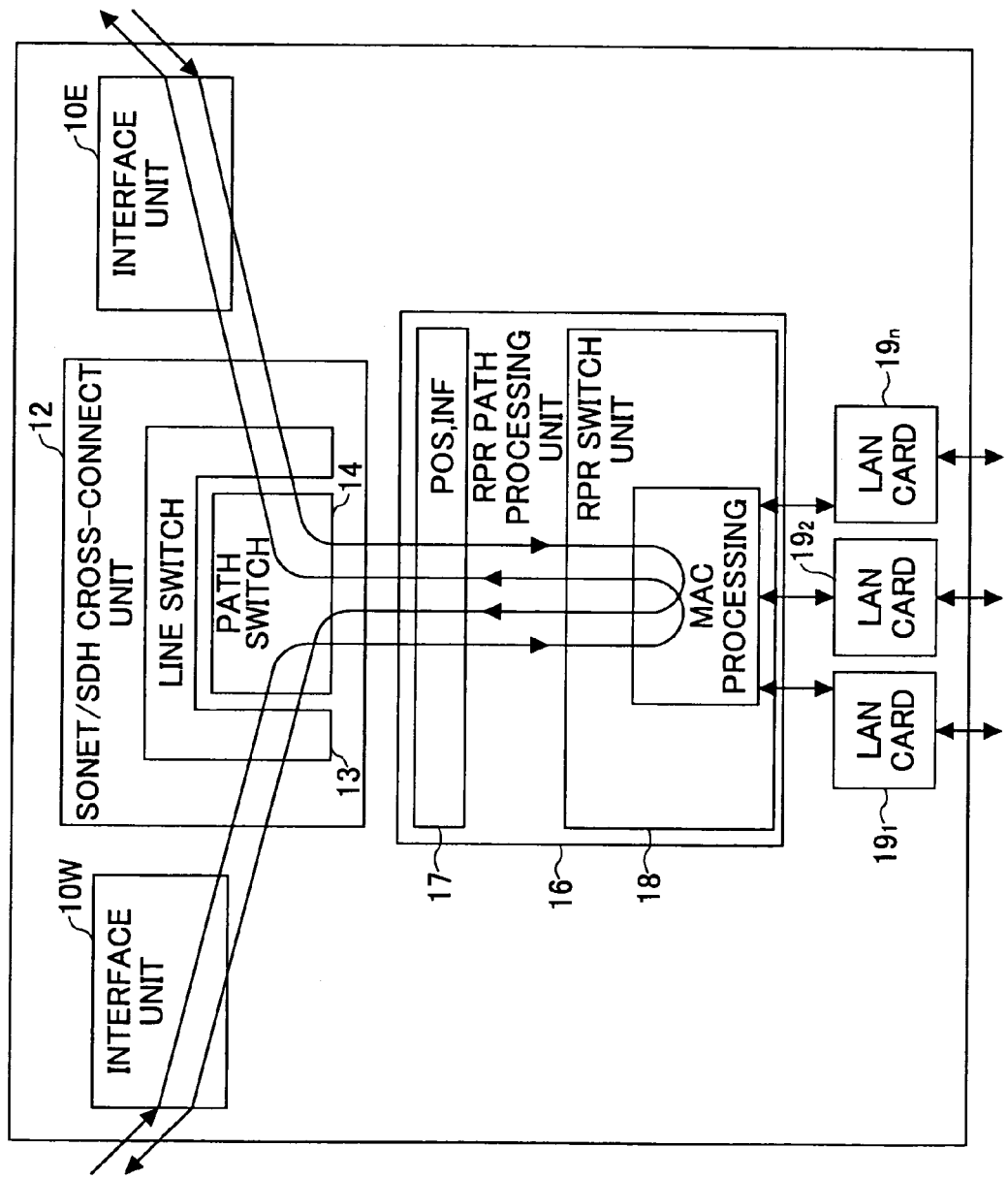

FIG.3A

|    | #1 | #2 | #3 | #12 | #1 | #2 | #3 | #12 | #1 | #2 | #3 | #12 |
|----|----|----|----|-----|----|----|----|-----|----|----|----|-----|
|    | A1 | A1 | A1 | A1  | A2 | A2 | A2 | A2  | -  | -  | -  | -   |
|    | B1 | -  | -  | -   | E1 | -  | -  | -   | -  | -  | -  | -   |
|    | -  | -  | -  | -   | -  | -  | -  | -   | -  | -  | -  | -   |
|    | H1 | H1 | H1 | H1  | H2 | H2 | H2 | H2  | H3 | H3 | H3 | H3  |
|    | -  | -  | -  | -   | -  | -  | -  | -   | -  | -  | -  | -   |
|    | -  | -  | -  | -   | -  | -  | -  | -   | -  | -  | -  | -   |
|    | -  | -  | -  | -   | -  | -  | -  | -   | -  | -  | -  | -   |
|    | -  | -  | -  | -   | -  | -  | -  | -   | -  | -  | -  | -   |
|    | -  | -  | -  | -   | -  | -  | -  | -   | -  | -  | -  | -   |

☐ − : ALL 0

FIG.3B

| BYTE NAME | CONTENTS |
|-----------|----------|
| A1 | "11110110"(0xf6) |
| A2 | "00101000"(0x28) |
| B1 | PARITY BIT (SAME AS ORDINARY STS FRAME) |
| E1 | CONCATENATION INFORMATION |
| H1 | POINTER RELATED BYTE |
| H2 | |
| H3 | |

FIG.3C

| ASSIGNED | CONTENTS | CONDITION |
|----------|----------|-----------|
| BIT 1 | UNUSED BITS | 0 |
| BIT 2 | STS-48 STATUS | 1:CONCATENATION |
| BIT 3 | STS-24 STATUS | 1:CONCATENATION |
| BIT 4 | STS-12 STATUS | 1:CONCATENATION |
| BIT 5 | STS-3#4 STATUS | 1:CONCATENATION |
| BIT 6 | STS-3#3 STATUS | 1:CONCATENATION |
| BIT 7 | STS-3#2 STATUS | 1:CONCATENATION |
| BIT 8 | STS-3#1 STATUS | 1:CONCATENATION |

MSB:BIT 1

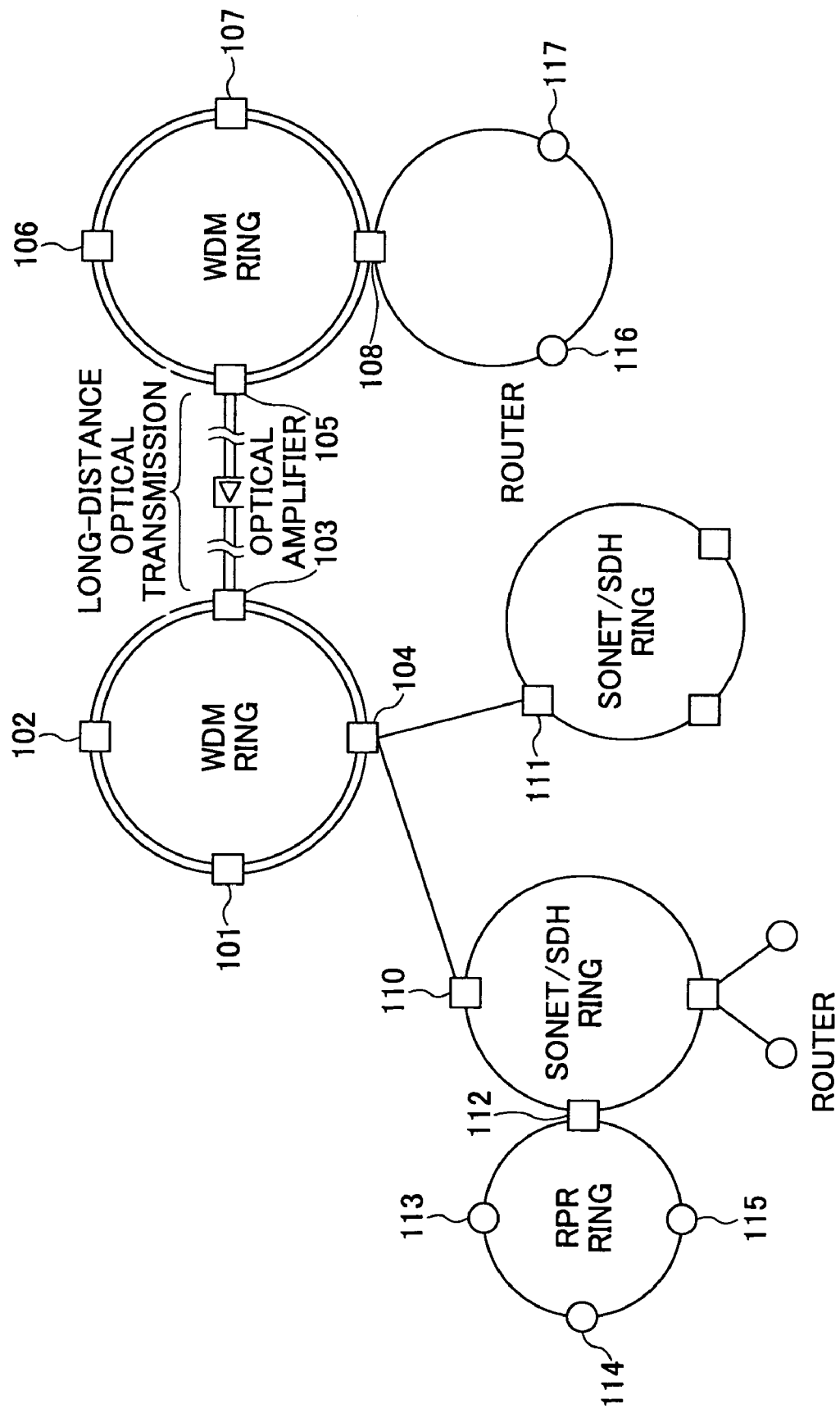

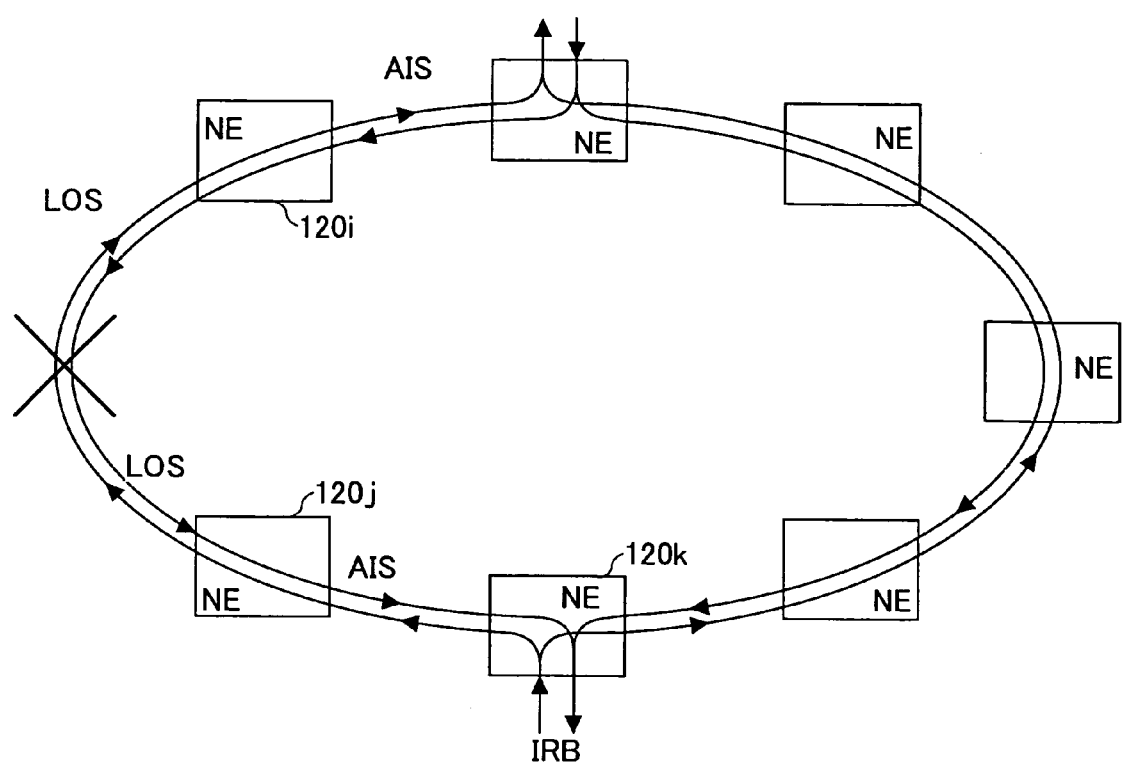

| A1 | A1 | A1 | A2 | A2 | A2 | J0 | Z0 | Z0 |
|---|---|---|---|---|---|---|---|---|
| B1 | — | — | E1 | E1 | — | F1 | — | — |
| D1 | D1 | — | D2 | D2 | — | D3 | — | — |
| H1 | H1 | H1 | H2 | H2 | H2 | H3 | H3 | H3 |
| B2 | B2 | B2 | K1 | — | — | K2 | — | — |
| D4 | — | — | D5 | — | — | D6 | — | — |
| D7 | — | — | D8 | — | — | D9 | — | — |
| D10 | — | — | D11 | — | — | D12 | — | — |
| S1 | Z1 | Z1 | Z2 | Z2 | M1 | E2 | E2 | — |

TRANSMISSION APPARATUS FOR MAKING RING SWITCHING AT SONET/SDH AND RPR LEVELS

BACKGROUND OF THE INVENTION

1. Field of the Invention

The invention generally relates to hybrid transmission apparatuses, and particularly relates to a hybrid transmission apparatus which establishes synchronization between SONET apparatuses and SDH apparatuses.

2. Description of the Related Art

Transmission apparatus (SONET/SDH apparatus) that constitutes an SDH (synchronous digital hierarchy) network or an SONET (synchronous optical network) attends to the control of a network, such as ring switching at the time of channel failure, only at the SONET/SDH layer by monitoring, terminating, and inserting the overhead of an SONET/SDH frame.

In WDM (wavelength division multiplexer) networks, also, only the WDM layer is subjected to network control. In IP (internet protocol) networks, further, network control is carried out only between routers that switch IP packets, i.e., only at the TCP/IP layer.

Against this background, talks for the standardization of RPR (resilient packet ring) that has the function to switch rings have recently been started at IEEE (U.S. electrical and electronic engineer association) with an aim of achieving the integrated network control of an IP network and an optical network. Moreover, various apparatuses and designs have been proposed as a RPR peer model (e.g., Japanese Patent Application Publication No. 2001-160840).

FIG. 1 is a block diagram showing an example of a related-art transmission apparatus having the RPR function. In FIG. 1, receiving units 1W and 1E and transmitting units 2W and 2E are connected to optical transmission lines of a LAN. Signals received by the receiving units 1W and 1E are routed by a switching engine 4 by referring to topology information stored in CAMs (content addressable memories) 3W and 3E, respectively. These signals are then supplied to the transmitting units 2W and 2E through ring switching, and are transmitted to the LAN.

A considerable number of WDM apparatuses, ADM (add drop multiplexer) of the SONET/SDH, cross-connect apparatuses, ATM (asynchronous transfer mode) nodes, etc., are already in existence. Despite this, communication providers need to replace existing facilities when introducing routers or the like having the RPR function. This forces the communication providers to bear significant expenses. If integrated network control can be achieved by partial modification to existing apparatuses, merits are enormous. Such apparatus design, however, has not been in existence. Further, it is cost effective if SONET/SDH apparatuses, WDM apparatuses having no OXC (optical cross connect) function, and OADM (optical add drop multiplexer) apparatuses can be upgraded. Such apparatuses, however, have not yet been designed.

The related-art transmission apparatus shown in FIG. 1 attempts the integrated control of networks at the RPR layer by consolidating all optical network topology configurations such as SONET/SDH and WDM. To this end, topology information about all networks needs to be stored in the database of the CAMs 3W and 3E and to be exchanged with other transmission apparatuses, thereby integrating the CAM databases of all the transmission apparatuses. If the size of networks is large, the database of the CAMs 3W and 3E grows large. Further, the processing load on the switching engine 4 becomes heavy because of the need to coordinate operations with the other transmission apparatuses.

Moreover, if network control is performed by controlling RPR, the provision of the RPR function in all the transmission apparatuses in the optical network is required for the purpose of achieving the control of the entirety of the network. This entails the replacement of existing SONET/SDH/WDM facilities. Such a scheme thus offers little merits to communication providers.

Moreover, failures occurring at the WDM or SONET/SDH layer may be collected for analysis, and automatic switching may be made to cope with channel failures. Such processing, however, may fail to be finished within a satisfactorily short period such as 50 ms that is achievable by the existing SONET/SDH apparatus.

Accordingly, there is a need for a transmission apparatus which can perform ring switching at the SONET/SDH level and ring switching at the RPR level independently of each other.

SUMMARY OF THE INVENTION

It is a general object of the present invention to provide a transmission apparatus that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a transmission apparatus particularly pointed out in the specification in such full, clear, concise, and exact terms as to enable a person having ordinary skill in the art to practice the invention.

To achieve these and other advantages in accordance with the purpose of the invention, the invention provides a transmission apparatus, including an aggregate-side interface unit coupled to an optical transmission line, a cross-connect unit which performs cross-connect with respect to a synchronized digital signal supplied from the aggregate-side interface unit, and a network signal processing unit which switches the synchronized digital signal in a unit of a network signal as the synchronized digital signal is supplied from the cross-connect unit.

In the transmission apparatus described above, ring switching at an SONET/SDH level by the cross-connect unit and ring switching at a RPR level by the network signal processing unit may be made independently of each other.

According to another aspect of the invention, the network signal processing unit includes a network signal extracting unit which extracts a network signal from the synchronized digital signal supplied from the cross-connect unit, a network signal switching unit which switches the extracted network signal, and a mapping unit which maps the network signal switched by the network signal switching unit onto a synchronized digital signal for transmission to the cross-connect unit.

In the transmission apparatus described above, ring switching may be made at a RPR level.

According to another aspect of the invention, the transmission apparatus further includes a tributary-side interface unit which is connected to the cross-connect unit, and interfaces one of an asynchronous digital signal and a network signal.

In the transmission apparatus described above, either one of the asynchronous digital signal and the network signal may be added/dropped.

According to another aspect of the invention, the network signal processing unit further includes an add/drop unit which drops the network signal supplied from the network signal switching unit, and adds a network signal supplied from an exterior to the network signal switching unit.

In the transmission apparatus described above, the network signal may be added/dropped.

According to another aspect of the invention, the network signal processing unit further includes a flow monitoring and adjusting unit which monitors and adjusts an amount of flow of the synchronized digital signal supplied from the cross-connect unit.

In the transmission apparatus described above, the capacity of the network signal switching unit may be reduced.

Other objects and further features of the present invention will be apparent from the following detailed description when read in conjunction with the accompanying drawings.

BRIEF DESCRIPTION OF THE DRAWINGS

FIG. 2 is a block diagram showing a first embodiment of the hybrid transmission apparatus of the invention;

FIG. 3A is an illustrative drawing showing the structure of an SOH (section overhead) complying with STS-12;

FIG. 3B is a table showing the contents of bytes A1-H3 of the SOH;

FIG. 3C is a table showing the contents of each bit of the E1 byte, which is concatenation information;

FIG. 4 is an illustrative drawing showing an example of a large-scale network to which the hybrid transmission apparatus of the invention is applied;

FIG. 6 is an illustrative drawing showing the construction of a UPSR network;

DESCRIPTION OF THE PREFERRED EMBODIMENTS

Figure 1:
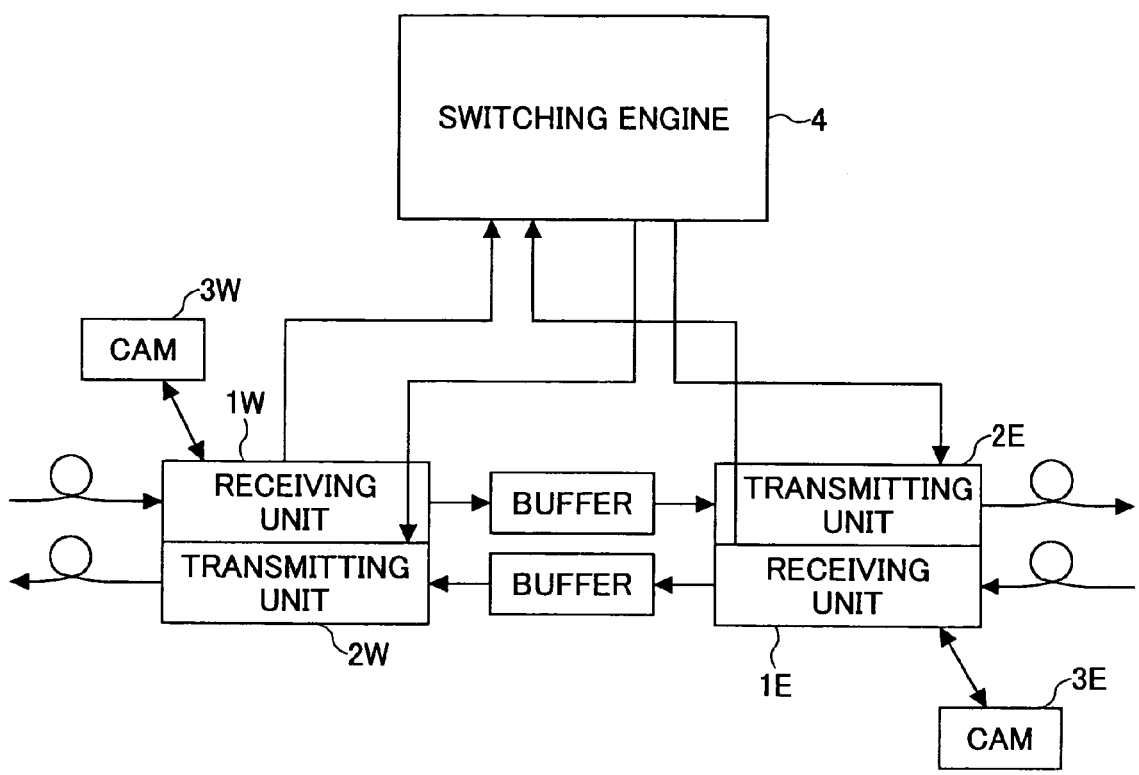
FIG. 1 is a block diagram showing an example of a related-art transmission apparatus having a RPR function.

In the following, embodiments of the present invention will be described with reference to the accompanying drawings.

In the present invention, a new function corresponding to RPR is added to a transmission apparatus that performs ADM or cross-connect of the conventional SONET/SDH. The invention offers various, diligent services by use of an add/drop function not only with respect to SONET/SDH interface but also with respect to PDH (plesiochronous digital hierarchy) signals and the signals of networks such as ATM and LAN (which includes WAN and MAN in this specification), thereby providing support for network transmission close to access networks and edge networks. The provision of an SONET/SDH transmission apparatus conforming to RPR achieves the integrated control of the entire network. In the following, the construction of the apparatus according to the invention will be described.

FIG. 2 is a block diagram showing a first embodiment of the hybrid transmission apparatus of the invention. In FIG. 2, interface units 10W and 10E convert optical signals of SONET/SDH such as 40 Gbps, 10 Gbps, 2.5 Gbps, or 622 Mbps (OC768, OC192, OC48, or OC12) signals into the electrical signals, and synchronize the signals with a reference clock that is internal to the apparatus. The interface units 10W and 10E then establish inter-block interface with an SONET/SDH cross-connect unit 12 by use of signals having the STS-48 (STM16)/STS-12 (STM4) format.

FIG. 3A is an illustrative drawing showing the structure of an SOH (section overhead) complying with STS-12. FIG. 3B is a table showing the contents of bytes A1-H3 of the SOH. FIG. 3C is a table showing the contents of each bit of the E1 byte, which is concatenation information.

Connection between the SONET/SDH cross-connect unit 12 and the interface units 10W and 10E is made by placing the SONET/SDH cross-connect unit 12 at a center with respect to the interface units 10W and 10E, thereby achieving centralized control by the SONET/SDH cross-connect unit 12. If too much processing load makes it difficult to achieve centralized control, functions are distributed to the interface units 10W and 10E, thereby achieving distributed processing.

The SONET/SDH cross-connect unit 12 is provided with the function to terminate and insert an overhead, and is capable of alarm processing and circuit control. Moreover, demultiplexing is performed up to an order of desired cross-connect, so that the cross-connect is carried out at a desired level.

Processing by a line switch 13 and a path switch 14 in the SONET/SDH cross-connect unit 12 maps IP packets onto the SONET/SDH such as to store the IP packets of a single route RPR in a specific SONET/SDH path such as STS-1, STS-3c, STS-12c, and STS-48c, thereby achieving network control including switching and ring switching through the same processing as in the conventional SONET/SDH cross-connect.

In a POS.INF (packet over SONET interface) 17 of a RPR path processing unit 16, a frame is detached from the SONET/SDH supplied from the SONET/SDH cross-connect unit 12, and a RPR packet is temporarily extracted. The RPR header is then identified, and a path along which the RPR packet (RPR header+IP packet) is to be transmitted is determined. A RPR switch unit 18 attends to routing, and the POS.INF 17 performs mapping onto the SONET/SDH again, followed by transmission to the selected path from the SONET/SDH cross-connect unit 12.

Figures 10, 11:
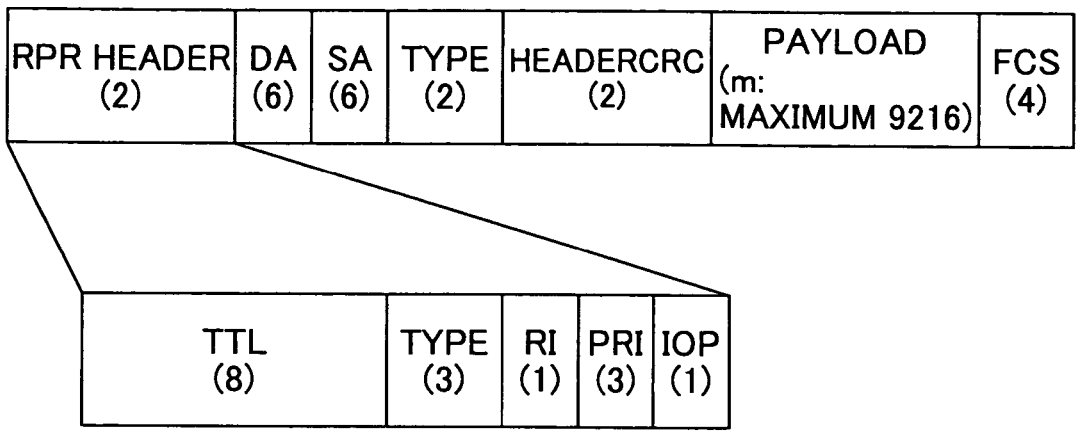
FIG. 10 is an illustrative drawing showing the format of a RPR packet.
FIG. 11 is a diagram showing the structure of the SOH complying with STM-1.

FIG. 10 is an illustrative drawing showing the format of a RPR packet. A RPR packet is provided with a RPR header, which is comprised of a TTL indicative of the start of the IP packet, a Type indicative of the type of the packet, a ring identifier (RI) for identifying either inner or outer, a PRI indicative of priority, and an IPO indicative of whether inside or outside a profile. In FIG. 10, numbers in brackets indicate the number of bits.

The RPR switch unit 18 is connected to LAN cards $19_1$-$19n$, each of which is coupled to a LAN such as a gigabit Ethernet. RPR packets received by the interface units 10W and 10E may be routed by the RPR switch unit 18 to the LAN cards $19_1$-$19n$, and are then dropped for transmission to the LAN. RPR packets received by the LAN cards $19_1$-$19n$ from the LAN are added to the SONET/SDH through routing by the RPR switch unit 18 to the SONET/SDH cross-connect unit 12.

When the RPR path processing unit 16 identifies a RPR header, information about path failure on IP paths is also identified for proper detour processing. Moreover, if the transmission apparatus detects path failure information, such information is added to the RPR header so that other transmission apparatuses can arrange a detour around the failed path. In this manner, transmission apparatuses treat path information in a unified manner not only at routers but also at intervening points where RPR are identified, thereby achieving the integrated control of the entire network.

It should be noted that it is also possible to use the apparatus of FIG. 2 as a portion of WDM apparatus by connecting the interface units 10W and 10E to demultiplexing units of the WDM apparatus.

FIG. 4 is an illustrative drawing showing an example of a large-scale network to which the hybrid transmission apparatus of the invention is applied. In FIG. 4, NEs (network elements) 101-104 and 105-108 make up respective WDM rings, with the NE 103 and NE 105 connected through a long-distance optical transmission path.

NEs 110 and 111, which form part of respective SONET/SDH rings, are connected to the NE 104. An NE 112 constitutes part of a RPR ring while constituting part of an SONET/SDH ring. That is, the NE 112 constitutes part of the SONET/SDH ring while making up the RPR ring together with routers 113-115. Moreover, an NE 108 makes up a RPR ring together with routers 116 and 117 while constituting a WDM ring. The transmission apparatus of the invention is used as the NE 112, and is also used as part of the NE 108.

It should be noted that while the NEs 110 and 111 can be implemented by use of a conventional SONET/SDH transmission apparatus, they may alternatively be implemented by the transmission apparatus of the invention.

Figure 5:
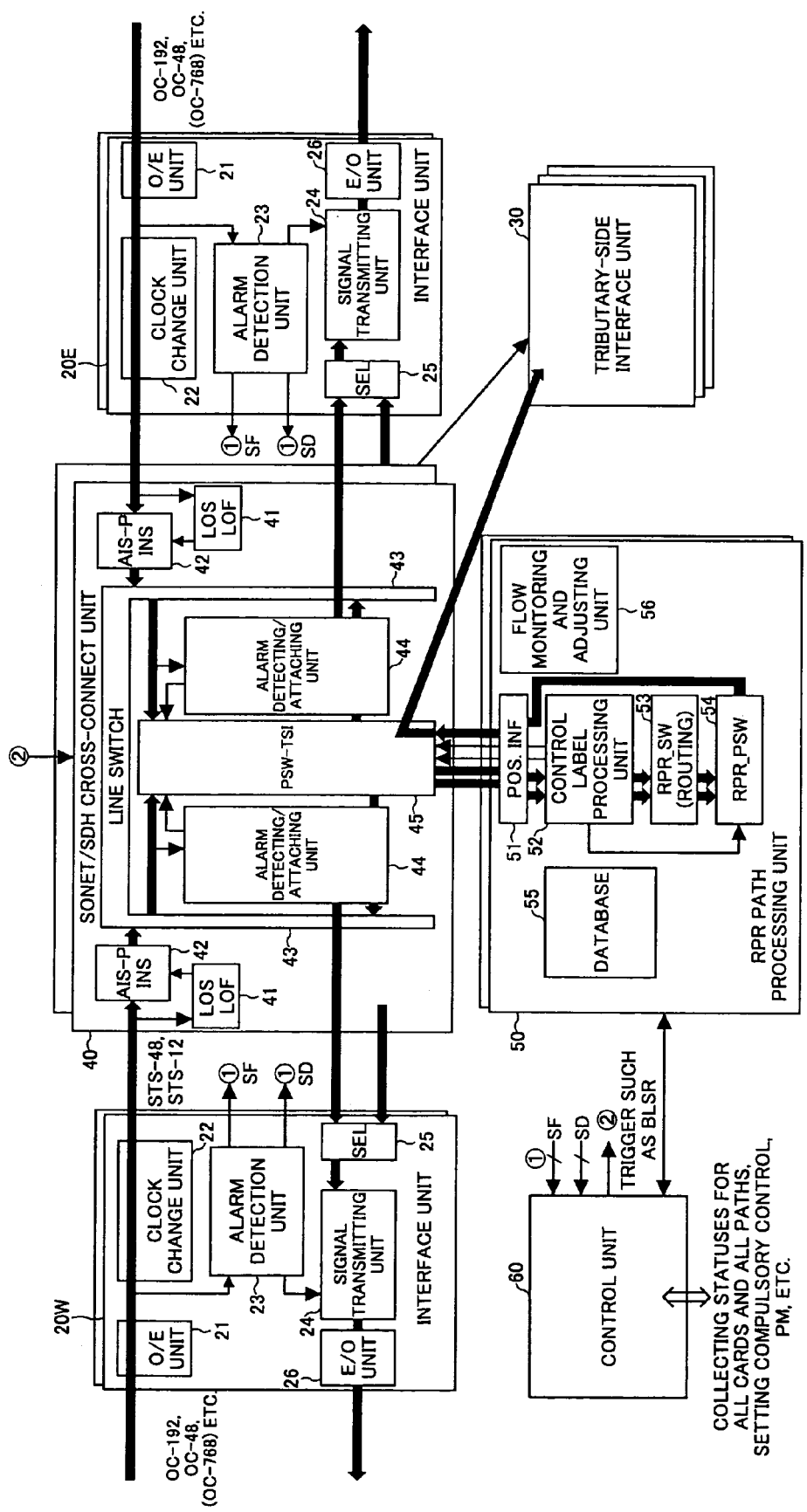
FIG. 5 is a block diagram showing a second embodiment of the hybrid transmission apparatus of the invention.

FIG. 5 is a block diagram showing a second embodiment of the hybrid transmission apparatus of the invention. In particular, a drop side where low-speed signals are extracted from a high-speed ring is illustrated in detail. Signals supplied from an NE (network element) that is situated upstream as a signal source may suffer path failure that may be the disconnection of signals or simply the degradation of signal quality. In FIG. 5, thick solid arrows indicate detection points and processing points along the signal flow so as to illustrate how to achieve effective path protection in an NE that is situated downstream as a signal receiver.

Moreover, a mechanism is also illustrated with regard to how to promptly inform NEs situated downstream when a serious failure such as disconnection or the loss of signal synchronization occurs upstream. Further illustrated is a mechanism regarding how the NE having received or detected a failure promptly informs the signal source and circumvents the failure automatically, if possible, when signals sent downstream suffer a failure that may be disconnection or the degradation of signal quality.

The illustrated apparatus may be regarded as a SONET/SDH transmission apparatus which performs add/drop, multiplexing, and cross-connect, and is provided with the RPR function that achieves the integrated network control of an SONET/SDH layer and RPR paths, which are virtual paths at upper layers when viewed from the SONET/SDH layer. Such apparatus does not impose the excess load on the RPR unlike the conventional art, and achieves high-speed processing with the little load by prioritizing functions and processes.

A point among others is as follows. That is, line redundancy inclusive of 1+1, 1:N, BLSR (bidirectional line switched ring), and the like and path redundancy at the SONET/SDH level inclusive of ring protection such as UPSR (unidirectional path switched ring) are performed at the cross-connect portion of the SONET/SDH level, followed by packet switching and path switching at the RPR level. Line switching and path switching at the respective layers are performed by detecting separate causes of switching by separate detectors. A line is regarded as a lower layer relative to a path, and an SONET/SDH path is regarded as a lower layer relative to a RPR path, so that switching at the lower layers is given priority.

Switching at a lower layer is immediately attended to when the cause of switching occurs. Switching at an upper layer is carried out when the cause of switching continues to exist with respect to this upper layer. This is because if switching occurs at a thick communication line in response to the detection of a failure at a lower layer, relatively thin communication lines are also switched at an upper layer, often resulting in the elimination of the cause of switching at the upper layer. With this provision, the load of path switching at the upper layers is reduced. Through redundancy at the lower layer, path switch works at the upper layer when no recovery is made.

For example, a timer stats counting in response to the occurrence of the cause of switching at the upper layer, and paths are switched if the cause of switching is in existence even after a preset time period. The preset time period may be set by the increments of 100 msec or the increments of 50 msec within a range from 0 second to 10 seconds.

With respect to line switching at the lower layer, the load on the cross connect unit becomes heavy if all detection points for detecting the cause of line switching are provided in an SONET/SDH cross-connect unit 40. Points at which path failure and the degradation of communication quality are detected are thus provided in interface units 20W and 20E of the transmission apparatus. The interface units 20W and 20E suffice to serve a purpose if they are provided with respective mechanisms corresponding to 1+1 line redundancy, 1:N line redundancy, the two fiber UPSR, the four fiber BLSR, a multiple-ring construction, etc. A control unit 60 collects switching triggers detected by the interface units 20W and 20E according to respective levels, and controls the line switching unit of the SONET/SDH cross-connect unit 40 accordingly.

In FIG. 5, the transmission apparatus includes the interface units 20W, 20E, and 30 for connection and exchange with external lines, the SONET/SDR cross-connect unit 40 of the SONET/SDH level, a RPR path processing unit 50 for processing paths on the RPR level, and the control unit 60 for the overall control of the apparatus.

SONET/SDH optical signals such as 40 Gbps, 10 Gbps, 2.5 Gbps, and 622 Mbps (OC768, OC192, OC48, and OC12) signals are supplied to the interface units 20W and 20E on the aggregate side. An O/E conversion unit 21 then converts the optical signals into electrical signals, and a clock change unit 22 establishes synchronization with a reference clock that is internal to the apparatus. The signals are then supplied to the SONET/SDR cross-connect unit 40 as electrical signals complying with STS-48 (STM16), STS-12 (STM4), or the like, of SONET/SDH.

The clock change unit 22 brings the signals received from the external lines to synchronization with the clock that is synchronized inside the apparatus. Since a large number of the interface units 20W and 20E may be provided in the apparatus, and are connected not only to a single ring but also to a plurality of rings and networks, the reference synchronizing clock may differ from network to network and from ring to ring. Because of this, synchronization is often nonexistent outside each interface unit. The clock change unit 22 is thus provided for every one of the interface units 20W and 20E. Moreover, the clock change unit 22 not only provides a function to withstand a clock difference between local networks, but also absorbs jitter and wonder associated with the networks, thereby eliminating the fluctuation of signal speed.

Moreover, an SOH may be replaced at a stage preceding or following the clock change unit 22, thereby terminating the SOH of the external lines for conversion into the signal format used inside the apparatus. Since a pointer is also changed at this time, an LOP-P or AIS-P of the external line signals can also be detected. If an LOP-P is detected, the pointer on the side for transmission to the apparatus is changed to an AIS-P.

The output signal of the O/E conversion unit 21 is supplied to the alarm detection unit 23. The alarm detection unit 23 attends to the detection of line alarms such as an LOS (Loss Of Signal), an LOF (Loss Of Frame), and an AIS-L (Alarm Indication Signal-Line) and a B2 byte error, and informs the control unit 60 of detection results SF and SD. SF is generated for major alarms such as an LOS and an LOF, and SD is generated for minor errors such as a B2 byte error or the like. Moreover, a signal transmitting unit 24 is also informed, thereby adding an RDI (Remote Defect Indicate) to a signal that is transmitted to a transmission line situated upstream. The signal transmitting unit 24 receives signals transmitted from a selector 25, and the signals output from the signal transmitting unit 24 are converted into optical signals by an E/O conversion unit 26.

Furthermore, the interface units 20W and 20E have a multiplexing/demultiplexing function if the external lines are OC-48, OC-192, or the like and the inside of the apparatus is STS-12, STS-24, and STS-48. If the external lines have a four-channel interface of OC-3, a multiplexing function for STS-12 or the like is provided. The selector 25 on the transmission side is provided for the purpose of conforming to the card redundancy of the SONET/SDH cross-connect unit 40. When signals received from the external lines are to be supplied to the SONET/SDH cross-connect unit 40, there is a need to send the same signals to both of the SONET/SDH cross-connect units 40 if card redundancy is performed at the SONET/SDH cross-connect unit 40. Card redundancy will later be described.

In the SONET/SDH cross-connect unit 40, signals supplied from the clock change unit 22 are provided to the alarm detection unit 41 and the alarm attaching unit 42. The alarm detection unit 41 notifies the alarm attaching unit 42 of the detection of a line alarm such as an LOS and an LOF, and the alarm attaching unit 42 adds an AIS-P (Path) to an SONET/SDH packet in response to the line alarm detection for transmission to a line switch 43.

The line switch 43 performs line switching inclusive of BLSR under the control of the control unit 60. When an alarm detecting/attaching unit 44 receives or detects a path alarm such as an LOP-P (Loss Of Pointer-Path), an AIS-P, a TIM-P, a PLM-P, a UNEQ-P, a TIM-P, and a PLM-P, an AIS-P is added to the output signal of the line switch 43 for supply to a path switch (PSW_TSI) 45 having a TSI (TimeSlot Interchanger). Moreover, when a path alarm is received or detected, a RDI-P is added to the signal supplied from the path switch 45 for supply to the interface unit through the line switch 43. The path switch 45 performs routing based on the header of an SONET/SDH packet.

The interface units 20W, 20E, and 30 are connected to the SONET/SDH cross-connect unit 40 through common format signals such as STS-3, STS-12, and STS-48 (or STS-24). Slots into which interface cards are inserted have unique ports that are assigned for a plurality of systems. The SONET/SDH cross-connect unit 40 discriminates and identifies individual slot ports, so that no limitation is imposed depending on the signal speed of the external lines of the interface cards.

Because of this, the interface units 20W, 20E, and 30 are successfully provided with universal external-line interface, which includes an SONET/SDH interface (i.e., the interface units 20W and 20E) for supporting OC (Optical Carrier)-192, OC-48, OC-12, OC-3, and the like, and also includes an external-line interface (i.e., the interface unit 30) conforming to PDH (plesiochronous digital hierarchy) such as DS3 and other LANs and ATMs.

For example, four sets of STS-12 signals may be connected to a basic minimum slot of the interface units 20W and 20E, so that this slot supports a card for a single OC-48 channel or a card for four OC-12 channels. If OC-3, DS3, or the like is used, a number of channels as many as acceptable for practical implementation can be supported (e.g., 12 OC-3 channels, 48 DS3 channels, and 48 EC1 channels).

Even if only the above-noted number of ports are available for a minimum slot, slots may be used four-fold, thereby supporting a single OC-192 channel. Even if the minimum slot is connected to the four lines inside the apparatus in the same manner as before, the signal speed of each line may be increased to STS-24 (1.2 Gbps) to provide an interface. This makes it possible to support double the number of channels for implementation. Namely, two channels are supported in the case of OC-48. Also, OC-192 can be supported by two slots, which are half as many as the previous configuration. If an increase to STS-48 per line is achieved, implementation density is further doubled.

Moreover, the use of such transmission technology as LVDS (low voltage differential signaling) makes it possible to easily increase the internal interface (backboard interface) to approximately 3.6 Gbps per line at serial signal speed. As a result, the interface card of OC-768 (=40 Gbps) can be supported through high density implementation. In the future, transmission speed exceeding 5 Gbps or 10 Gbps within an apparatus will become possible, which makes it possible to provide a higher-density, compact transmission apparatus at a low cost.

In FIG. 5, separation is made into the interface units 20W and 20E on the high-speed aggregate side and the interface unit 30 on the low-speed tributary side. This can properly be done by setting signal lines through cross connections inside the transmission apparatus while taking into account, under the current network construction, how fast the signal speed is (e.g., OC-192, OC-48, OC-768, or the like) at the external line connections of the transmission apparatus on the high-speed side and how fast the signal speed is (e.g., OC-48, OC-12, OC-3, EC-1, PDH, etc.) on the low-speed side such as on the drop side or the downstream-ring side. Although the SONET was cited as an example of the high-speed external lines, SDH signals such as STM-64, STM-16, STM-4, STM-1, STM-0, and STM-256 can as well be supported.

Cross connection by the SONET/SDH cross-connect unit 40 can also be made in various path units such as STS-1, STS-3c, STS-12c, STS-48c, etc. In recent years, specifications for the 10 Gbit Ethernet LAN have almost been fixed. It is thus possible to support cross connections in units of 10 Gbps, i.e., in units of STS-192c. It should be noted that cross connection is achievable in units of VC-4, VC-4-4, VC-4-16, and VC-4-64 or at the AU3 level, if SDH terminology is employed.

Even if signal speed inside the apparatus only supports STS-12, STS-24, and STS-48 at the maximum, the interface units 20W and 20E may be provided with an external-line interface for OC-48 or OC-192 (or OC-768) that contains aggregated signals of STS-48c or STS-192c. In order to conform to such interface cards, a port of four or more lines is provided for each slot. The demultiplexing unit of the interface units 20W and 20E for conversion into internal signals may perform serial-to-parallel conversion with respect to large aggregated signals exceeding STS-48c, and may separate the signals for each line, followed by parallel-to-serial conversion into original signals by the SONET/SDH cross-connect unit 40.

Aggregated signals each having signal speed lower than line signal speed such as lower than STS-12c may be multiplexed into OC-n for interface at the interface units 20W and 20E. In such a case, it suffices to relate the port of each line to the position of a multiplexed signal in an organized manner, and, then, signals corresponding to respective line ports may properly be distributed at a point where external-line signals are converted into internal signals by the interface units. With this provision, processing by the SONET/SDH cross-connect unit 40 is simplified, and hardware construction for cross-connect is also simplified.

When the interface unit 30 provides interface for PDH signals or signals lower than OC-12 or OC-3, the total capacity of external lines may not amount to the total capacity of one slot for inside-apparatus signals. In such a case, remaining ports for inside-apparatus signals may be set aside for the flow of unique pattern signals. When cross-connect is to be set up, the paths for which no unique pattern signal is existent are restricted through software means so that no cross-connect is made for these paths.

Figure 9:
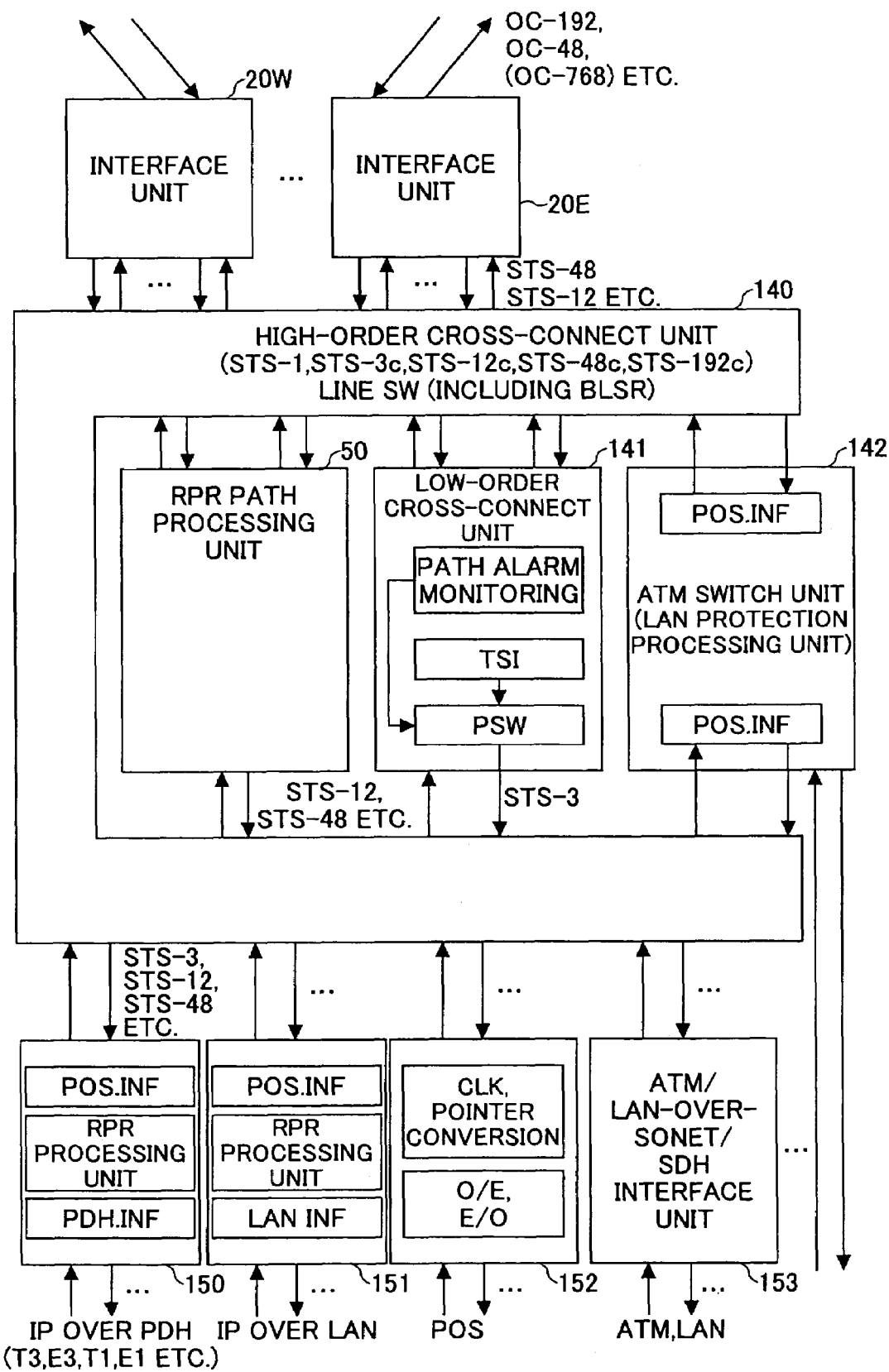
FIG. 9 is an illustrative drawing showing the flow of signals between aggregate-side interface units and the tributary-side interface unit shown in FIG. 5.

Moreover, even when signal speed is low, i.e., even when cross-connect is made in units of VT1.5, TU3, TU-12, and TU-11, fine paths can be properly treated. To this end, it suffices to add a cross-connect unit of a low order as shown in FIG. 9, which will later be described.

The transmission apparatus shown in FIG. 5 may be an NE constituting a UPSR as shown in FIG. 6, or may be an NE constituting a 4-fiber BLSR as shown in FIG. 7. Moreover, the same processing is achievable for an NE constituting a mesh network as shown in FIG. 8 if there is a mechanism such as an AIS or RDI or an NMS (network management system) capable of collecting and controlling information from each transmission apparatus.

With reference to FIG. 5, a description will be given of a mechanism for path-failure circumvention by showing examples of alarms and error detection items along the flow of main signals shown by thick solid lines, with particular emphasis on the drop side. The interface unit 20E on the aggregate side transmits and receives East (clockwise) optical signals, and the interface unit 20W on the aggregate side transmits and receives West (counterclockwise) optical signals. In the case of four-fiber BLSR, another line is received and transmitted through another channel of the interface card or through another interface card. The interface units on both the left aggregate side and the right aggregate side receive the W side and P side of a current line for the span switch purposes if the East is set as a current line and the West is set as a backup line. The interface unit for the backup line running in an opposite direction along the ring is hidden. As for a single node of a mesh network, a plurality of connected nodes and other nodes are connected by other. interface units. If connections to more than dual rings are provided, interface units are provided as many.

The SONET/SDH cross-connect unit 40 is illustrated as two cards that overlap each other. These two cards function in an identical manner, so that a failure of one of the cards will not result in the loss of signals, thereby providing for card redundancy. With such mechanism of card redundancy, the robustness of apparatus is dramatically boosted, resulting in increased reliability.

Two signal lines extending from the SONET/SDH cross-connect unit 40 to the interface units 20W and 20E are illustrated, and the selector 25 is provided in the interface units 20W and 20E. This shows the redundancy mechanism of the cross-connect cards. The interface units 20W and 20E select one that is of higher quality, thereby achieving automatic card redundancy. The RPR path processing unit 50 is also illustrated as two cards that overlap each other. This indicates that such card redundancy, if applied to this portion, improves reliability. It should be noted, however, that signals indicative of card redundancy are not shown for the portion that exchanges signals between the SONET/SDH cross-connect unit 40 and the RPR path processing unit 50 for the sake of clarity of drawing.

If it is desired to provide card redundancy for the RPR path processing unit 50, the concept of 1:N card redundancy for the interface units 20W and 20E is utilized. That is, an empty port of the SONET/SDH cross-connect unit 40 is connected to the RPR path processing unit 50 having card redundancy, and a current signal is switched for the processing of the same signal connected to another port in response to a trigger caused by card failure.

Coordination between the line switching and path switching of SONET/SDH and the path switching of RPR will be described in the following with reference to the example of the signal flow indicated by the thick solid lines in the transmission apparatus of FIG. 5. For the sake of simplicity of explanation, attention is here directed to a situation in which USPR or 1+1 line redundancy is provided, and in which signals coming from upstream on the aggregate side are dropped downstream at a point connected to the tributary side.

With respect to lines at the SONET/SDH layer and paths that are subjected to UPSR, virtual paths at the RPR level may also correspond to these paths. In this case, path failures may be collectively circumvented by line switching at the SONET/SDH layer or by UPSR path switching, so that path failures along the RPR virtual paths are automatically recovered as well. With this provision, the load on RPR path switching is reduced.

However, paths at the SONET/SDH layer do not necessarily correspond to RPR virtual paths. This is because, on the RPR virtual paths, it is possible to lay out a mesh within an SONET/SDH ring, and virtual paths must be taken into account by going further upstream at the RPR layer if there is a RPR path added to the SONET/SDH ring.

If the network control of RPR virtual paths is required, therefore, the RPR path processing unit 50 as shown in FIG. 5 becomes necessary. Although all the traffic that flows through SONET/SDH is not necessarily IP, SONET/SDH paths that include RPR at higher layers are dropped from the SONET/SDH cross-connect processing unit 40 to the RPR path processing unit 50. When this is done, there is no absolute need to drop all the SONET/SDH paths that include RPR at the higher layers. Path control at lower layers is sufficient for the RPR paths that completely correspond to SONET/SDH paths, so that the load on the RPR path processing unit 50 is reduced. A design for adding RPR paths to SONET/SDH for this purpose will be described later.

The RPR path processing unit 50 includes a POS.INF (Packet Over SONET Interface) 51 for conversion between RPR packets and SONET/SDH packets, a control label processing unit 52 for identifying RPR headers (control labels) and for switching control, a routing switch (RPR_SW) 53 for performing the routing of RPR packets based on the RPR headers, a packet path switch (RPR_PSW) 54 for dropping RPR packets, a database 55 for storing a routing table or the like for the routing purpose, and a flow monitoring and adjusting unit 56 for monitoring and adjusting the flow of RPR packets.

The RPR path processing unit 50 performs the routing of RPR packets based on the RPR headers as the RPR packets are extracted from SONET/SDH packets, and then maps them onto the SONET/SDH packets for outputting to corresponding SONET/SDH ports, thereby returning them to the SONET/SDH cross-connect unit 40.

The SONET/SDH cross-connect unit 40 receives signals returning from the RPR path processing unit 50, and transmits the signals to the interface unit 20W, 20E, or 30 corresponding to a desired SONET/SDH path through further cross connection. This interface unit for signal output is not limited to the interface units 20W and 20E for SONET/SDH, but may as well be the interface unit 30 for PDH, LAN, and ATM with the function to convert SONET/SDH into PDH, LAN, or ATM.

The RPR path processing unit 50 drops RPR packets at the packet path switch 54 in addition to the routing operation. An ATM switch unit 142 performs this dropping operation as will be described in connection with FIG. 9. Although the database 55 includes the routing table or the like for the routing purpose, a database about the network topology may be included in a network management system (not shown).

The flow monitoring and adjusting unit 56 monitors and adjusts the amount of flow of RPR packets. Such flow monitoring and adjusting function is not necessary if the switching capacity and performance of the routing switch 53 are sufficient to cope with maximum port numbers used for transmission from the SONET/SDH cross-connect unit 40 to the RPR path processing unit 50. In order to lower the cost of the routing switch 53, the multiplicity of RPR statistics is taken into consideration. With switching capacity and performance determined as a matter of design choice, the flow monitoring and adjusting unit 56 discards packets by selecting those having lower priority if the amount of flow exceeds a tolerable range. The flow monitoring and adjusting unit 56 then uses a control header or the like to request the SONET/SDH cross-connect unit 40 situated upstream that no more packets are transmitted. The amount of flow may fluctuate with time, so that it exceeds the tolerable range only temporarily (or instantaneously). In such a case, the POS.INF 51 is provided with a buffer to average the amount of flow over a time period, thereby achieving temporal smoothing. This is equivalent to the shaving function. With these functions, the switching capacity of RPR is economized so as to achieve cost reduction.

Interfacing between the SONET/SDH cross-connect unit 40 and the RPR path processing unit 50 is carried out by the same format as the connection between the SONET/SDH cross-connect unit 40 and the interface units 20W and 20E. If the inside-apparatus connection is a plurality of STS-12s, for example, connection between the two has a communication capacity equal to (STS-12)×(the number of connected channels). If connection is made in units of STS-24, STS-48, or the like, the communication capacity is equal to the signal speed multiplied by the number of connected channels.

If the minimum-size slot of an interface card has connection lines for four sets of STS-48s, the insertion of a single card of the RPR path processing unit 50 into the two slot space of the interface card provides for each card to have RPR path processing capacity equal to 40 Gbs. If an increase in the RPR path processing capacity is desired, signal speed per channel may be boosted, thereby achieving an increased capacity. In this manner, the interface units 20W and 20E and the RPR path processing unit 50 are equal when only physical connections to the SONET/SDH cross-connect unit 40 are considered. This feature is the key to the effective utilization of existing assets when adding the RPR path processing unit 50 to a conventional SONET/SDH apparatus.

The use of the interface slots of the interface unit 30 also achieves not only the RPR path processing unit 50 but also a low-speed, diligent cross-connect unit such as VT1.5 and TU-12, an ATM switch unit, a LAN switch processing unit, a VT1.5-and-TU-12 conversion unit, a conversion between SONET and SDH such as between AU-3 and VC-3 of AU-4.

Signals are supplied from the SONET/SDH cross-connect unit 40 to the RPR path processing unit 50 through cross-connects, and, then, are sent to the interface unit through the SONET/SDH cross-connect unit 40 again after routing. Because of this signal flow, the physical arrangement of signals assigned to the ports connecting between the RPR path processing unit 50 and the SONET/SDH cross-connect unit 40 may be arbitrary.

For example, the earlier a signal is taken up for allocation to a path, the smaller the port number to which the signal is assigned. The reason is as follows. At a portion at which signals are input into the RPR path processing unit 50 from the SONET/SDH cross-connect unit 40, physical ports may properly be fixed for inputting since the number of signals exceeding the number of ports of the POS.INF 51 cannot be input. As a result, there is no need to provide an excessive selector in the RPR path processing unit 50 and thereby to distribute the signals to the input ports of the routing switch 53.

However, it is expected that path failure circumvention is also performed independently at the RPR virtual path layer. A path covered by redundancy is thus directly input into the RPR path processing unit 50 for path switching that is performed based on independent detection criteria. Thus, an input port prepared for the redundant path is not necessary.

After routing (and selecting a higher-quality path from path redundancy) by the RPR path processing unit 50, RPR packets are loaded to desired SONET/SDH layers, and destinations are switched. Since signals supplied from the RPR path processing unit 50 are sent to the SONET/SDH cross-connect unit 40 and then to the interface units connected to respective destinations, it suffices to connect signal lines physically to the output ports of the RPR path processing unit 50 in the order of output port numbers of the routing table without regard to the destination interface units. It is sufficient for a transmission apparatus to have matching connection between the destinations of signals after path routing and the end points of interface connections. Accordingly, software control suffices to achieve cross-connections through collaboration of the two at the cross-connects in the SONET/SDH cross-connect unit 40 after outputting from the RPR path processing unit 50. A management system of the transmission apparatus may allow an operator to select paths and channels of the interface unit that is a destination of post-routing paths. Processing for setting cross connections in the SONET/SDH cross-connect unit 40 after passing through the RPR path processing unit 50 is flexible as it is automatically done by software. Since the processing is simple as described above, no excess time and labor are necessary for software development.

In the following, a description will be given of the mechanism of collaboration between SONET/SDH path recovery and RPR path recovery with reference to FIG. 5. As a premise, the transmission apparatus needs to perform the same processes as in the conventional system at the SONET/SDH layers. Thus, when the alarm detection unit 23 receives an LOS (Loss Of Signal) or an LOF (Loss Of Frame) from upstream, the signal transmitting unit 24 transmits an AIS-L to a line extending downstream.

When the alarm detection unit 41 detects an LOS, an LOF, an AIS-L, or a TIM-L or the like depending on settings with respect to a line extending upstream, the alarm attaching unit 42 transmits an AIS-L to a path extending downstream, and, at the same time, the signal transmitting unit 24 transmits a RDI-L to a transmission-side line that extends upstream.

Moreover, when the alarm detecting/attaching unit 44 receives an LOP-P, an AIS-P, a UNEQ-P, or either a TIM-P or a PLM-P depending on settings with respect to a path situated upstream, the alarm detecting/attaching unit 44 transmits an AIS-P to a path extending downstream, and sends a RDI-P to the path situated upstream. The alarm detecting/attaching unit 44 is provided with the performance monitoring function to detect a B1 byte error or B2 byte error of SOH as information indicative of degradation (i.e., an error rate) of channels and thereby to detect an error rate of received signals. When a B2 byte error is received, the number of error bits is inserted into predetermined bits of the M1 byte for transmission to the transmission side. FIG. 11 is a diagram showing the structure of SOH complying with STM-1.

The alarm detecting/attaching unit 44 checks whether a path corresponding to a received signal suffers an error (signal degradation) by detecting the B3 byte of a POH (path overhead), and returns the number of B3 error bits through predetermined bits of the G1 byte to the transmission side situated upstream. With this provision, a transmission apparatus situated upstream learns the occurrence of an error on the transmission path.

Moreover, if a PDH interface unit is provided in the interface unit 30, the SONET/SDH cross-connect unit 40 makes cross connections only with respect to high-speed paths, and paths terminating at the PDH interface may sometimes directly reach the PDH interface unit. As for signals transmitted to the exterior of the transmission apparatus from the PDH interface, an RDI may be returned in an opposite direction by detecting a path alarm before the termination of paths, and, also, a REI may be returned in the opposite direction by detecting a path error. Such functions are given to the alarm detecting/attaching unit 44.

FIG. 6 is an illustrative drawing showing the construction of a UPSR network. In FIG. 6, when line severance occurs between an NE 120i and an NE 120j, the NEs 120i and 120j transmit an AIS in response to an LOS detection. An NE 120k receiving the AIS switches lines at an SONET/SDH layer by the SONET/SDH cross-connect unit 40 shown in FIG. 5, thereby circumventing the failure.

Figure 7A:
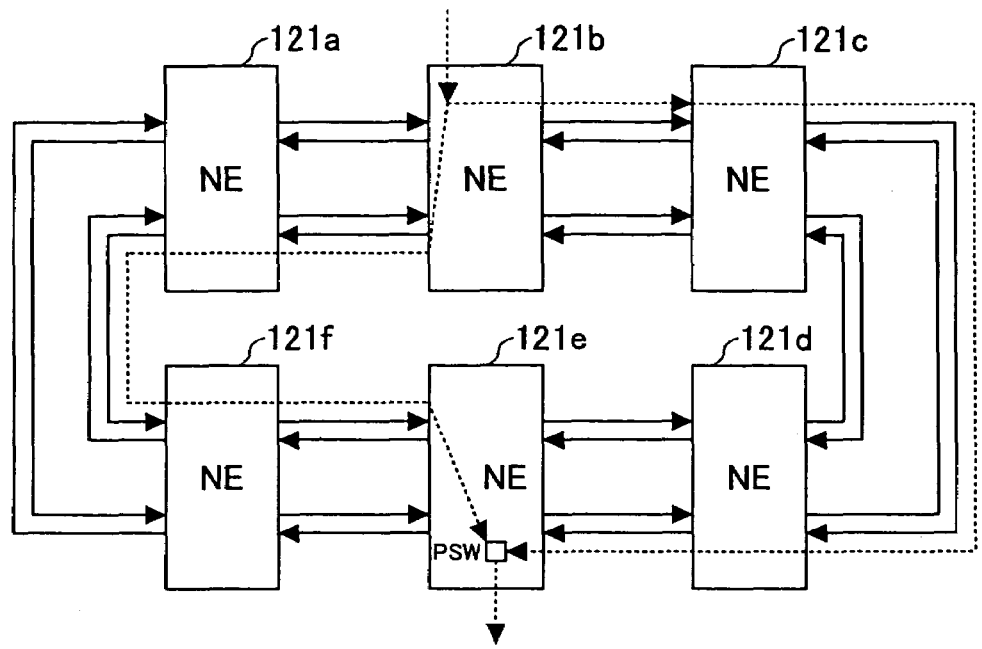
FIGS. 7A and 7B are illustrative drawings showing the construction of 4-fiber BLSR network.
Figure 7B:
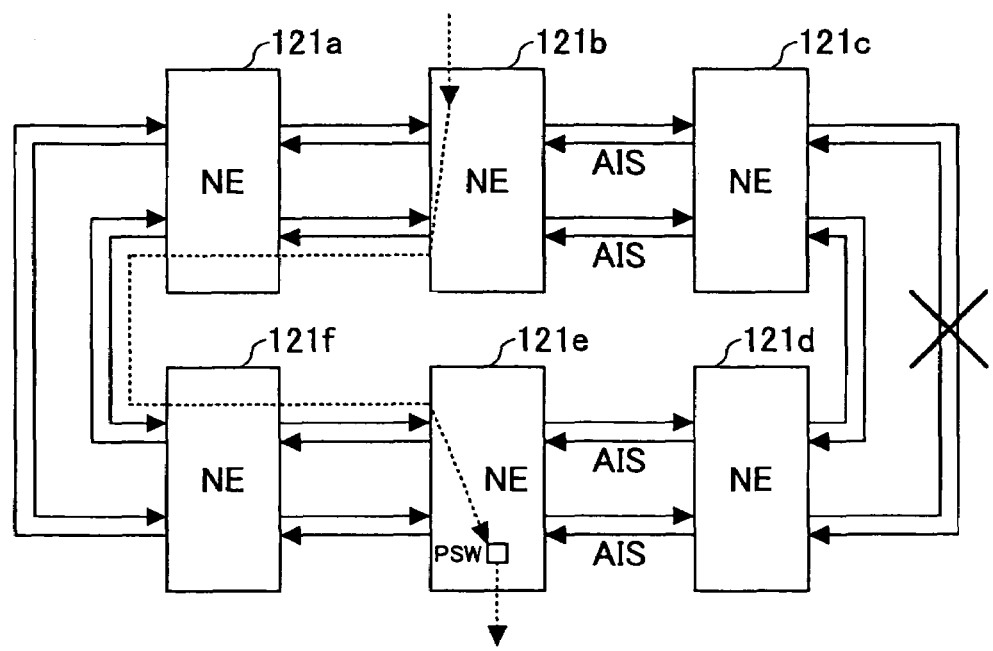
Figure 8:
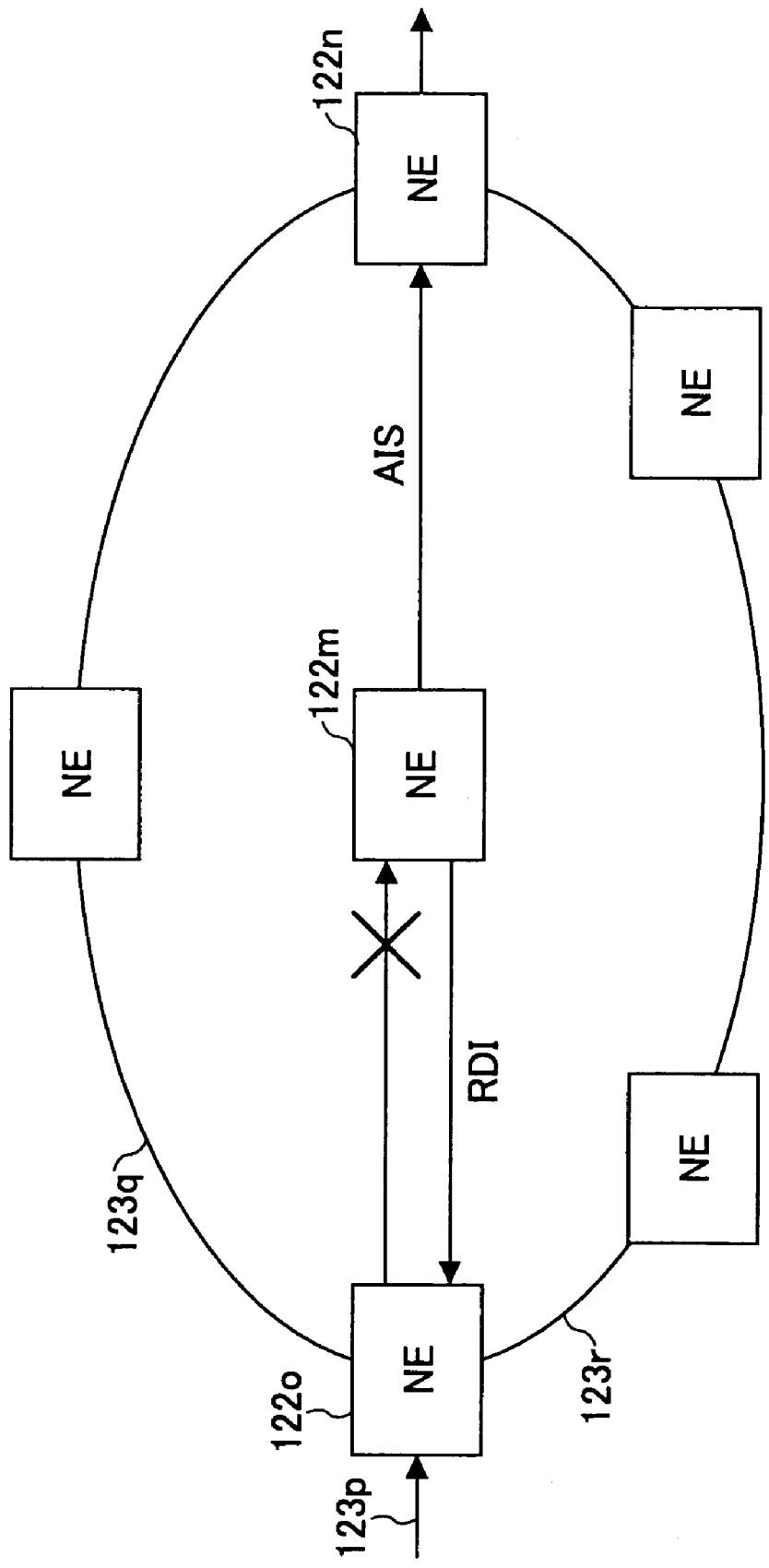
FIG. 8 is an illustrative drawing showing the construction of a mesh network.

FIGS. 7A and 7B are illustrative drawings showing the construction of 4-fiber BLSR network. FIG. 7A shows a normal state. A path added at an NE 121b is transmitted to an NE 121e through a clockwise course and a counterclockwise course shown by dotted lines. The PSW of the NE 121e selects one of the paths of respective courses, which is then dropped at the NE 121e.

FIG. 7B shows a state in which a line-severance failure occurs between an NE 121c and an NE 121d. The NEs 121c and 121d transmit AISs in response to LOS detection. Having received the AISs, the NE 121e switches lines at an SONET/SDH layer by the SONET/SDH cross-connect unit 40 shown in FIG. 5, thereby circumventing the failure.

FIG. 8 is an illustrative drawing showing the construction of a mesh network. In FIG. 8, the occurrence of a failure at the position indicated by "x" results in an NE 122m transmitting an AIS to an NE 122n situated downstream and transmitting a RDI to an NE 122o situated upstream. The NE 122o receiving the RDI switches lines at an SONET/SDH layer by the SONET/SDH cross-connect unit 40 shown in FIG. 5, thereby circumventing the failure by distributing signals received from a line 123p to lines 123q and 123r.

FIG. 9 is an illustrative drawing showing the flow of signals between the aggregate-side interface units 20W and 20E and the tributary-side interface unit 30 shown in FIG. 5. FIG. 9 shows that the transmission apparatus of the invention is of a hybrid type, and provides multi services such as high-order cross connection, low-order cross connection, ATM, PDH, LAN, SONET/SDH, etc. In FIG. 9, the same elements as those of FIG. 5 are referred to by the same numerals, and a description thereof will be omitted.

A high-order cross-connect unit 140, a low-order cross-connect unit 141, and an ATM switch unit (or LAN protection processing unit) 142 shown in FIG. 9 correspond to the SONET/SDH cross-connect unit 40 of FIG. 5. A PDH interface unit 150, a LAN interface unit 151, a POS interface unit 152, and an ATM/LAN-over-SONET/SDH interface unit 153 correspond to the tributary-side interface unit 30 of FIG. 5.

The PDH interface unit 150 includes a PDH.INF for conversion between RPR packets and SONET/SDH packets, a RPR processing unit for routing RPR packets and performing add and drop, and a POS.INF for interfacing between RPR packets and the PDH. The LAN interface unit 151 includes a PDH.INF for conversion between RPR packets and SONET/SDH packets, a RPR processing unit for routing RPR packets and performing add and drop, and an LAN.INF for interfacing between RPR packets and a LAN. The ATM/LAN-over-SONET/SDH interface unit 153 performs conversion between RPR packets and SONET/SDH packets, and interfaces between RPR packets and the ATM.

According to the invention, the SONET/SDH/WDM layer and the TCP/IP layer, which were controlled separately in the conventional system, are controlled by a single apparatus, thereby achieving the integrated control of the entire network. As a result, costs for the installment of optical networks for IP transmission and running costs are dramatically reduced.

Further, the present invention is not limited to these embodiments, but various variations and modifications may be made without departing from the scope of the present invention.

The present application is based on Japanese priority application No. 2003-025000 filed on Jan. 31, 2003, with the Japanese Patent Office, the entire contents of which are hereby incorporated by reference.

What is claimed is:

1. A transmission apparatus, comprising:
an aggregate-side interface unit coupled to an optical transmission line;
a cross-connect unit which perform cross-connect with respect to a synchronized digital signal supplied from said aggregate-side interface unit;
a network signal processing unit which switches the synchronized digital signal in a unit of a network signal as the synchronized digital signal is supplied from said cross-connect unit;
wherein said network signal processing unit further includes a flow monitoring and adjusting unit which monitors and adjusts an amount of flow of the synchronized digital signal supplied from said cross-connect unit, and the flow monitoring and adjusting unit is configured to send a request to the cross-connect unit when an amount of RPR (resilient packet ring) packets exceeds a tolerable level, to request the cross-connect unit that no more RPR packets be transmitted, and wherein the network signal is an RPR frame signal.

2. The transmission apparatus as claimed in claim 1, wherein said network signal processing unit further comprises:

the network signal extracting unit which extracts a network signal from the synchronized digital signal supplied from said cross-connect unit;

a network signal switching unit which switches the extracted network signal; and a mapping unit which maps the network signal switched by said network signal switching unit onto a synchronized digital signal for transmission to said cross-connect unit.

3. The transmission apparatus as claimed in claim 2, wherein said network signal processing unit further includes an add/drop unit which drops the network signal supplied from said network signal switching unit, and adds a network signal supplied from an exterior to said network signal switching unit.

4. The transmission apparatus as claimed in claim 1, further comprising a tributary-side interface unit, connected to said cross-connect unit, which interfaces one of an asynchronous digital signal and a network signal.

5. The transmission apparatus as claimed in claim 4, wherein said tributary-side interface unit extracts one of an asynchronous digital signal and a network signal from a synchronized digital signal supplied from said cross-connect unit for dropping to an exterior, and adds one of an asynchronous digital signal and a network signal supplied from the exterior.

6. The transmission apparatus as claimed in claim 1, wherein said network signal processing unit performs ring switching in a LAN by use of an RPR (resilient packet ring) function.

7. The transmission apparatus as claimed in claim 1, wherein the synchronized digital signal is one of an SONET signal and an SDH signal.

8. The transmission apparatus as claimed in claim 1, wherein said cross-connect unit and said network signal processing unit are connected through RPR signals.

* * * * *